United States Patent Office 2,895,930
Patented July 21, 1959

2,895,930

WATER EMULSION OF POLYMERIZABLE EPOXIDE GROUP CONTAINING OIL MODIFIED ALKYD AND FORMALDEHYDE CONDENSATION RESINS

Milton Yusem, Chicago, Ill., assignor to Bradley & Vrooman Company, a corporation of Illinois No Drawing. Application June 28, 1955
Serial No. 518,665

15 Claims. (Cl. 260—21)

This invention relates to emulsions and dispersions including water and a heat-reactive resin which combines within the same molecule the desirable reactive structural features of the oil modified alkyd resins and the polymerizable polyether polyepoxide groupings associated with the epoxy resins which contribute to non-ionic dispersing characteristics of the resin permitting improved dispersion compositions for adhesive, coating, pigment paste applying and similar applications.

The novel compositions of the invention include useful textile treating compositions for imparting water repellency to textile fabric including those made from synthetic hydrophobic fibers, such as nylon and Dacron (polyethylene terephthalate). The emulsion compositions further include aqueous dispersions of polymerizable polyether polyepoxide oil modified alkyd resins in admixture with dispersible etherified melamine formaldehyde resins which are particularly useful as heat hardenable lacquers for metal and for air drying architectural finishes. The invention also includes within its scope new formulating methods by means of which new and useful synthetic resinous compositions are produced either in the form of an aqueous dispersion or in the form of a redispersible powder or paste mixture capable of forming an aqueous dispersion on mixing with water.

More particularly this invention is concerned with new and useful resinous dispersions containing:

(1) A polymerizable ether epoxide oil modified alkyd resin prepared by the dehydrohalogenation of an epihalohydrin ether addition product of a short to medium oil modified alkyd resin having from 8 to 20 carbon atoms in the fatty acid molecule, an acid number below 60, and sufficient free hydroxyl groups in said alkyd resin to provide about ½ to 2½ epoxy groups by reaction with said epihalohydrin in each molecule of said alkyd resin after dehydrogenation, the epoxy groups of said alkyd resin which are adapted to cross-link in the presence of an epoxy cross-linking agent, and (2) a member of the group consisting of an etherified melamine-aldehyde resin or an etherified urea-formaldehyde resin.

(3) Instead of component (1) of the new and useful dispersions in accordance with the invention there may be used a mixed polymer of (1) as defined above and a vinylidine monomer, which is prepared by polymerizing a mixture of component (1) and a vinylidine monomer containing one or more $CH_2=C=$ groupings but which has no conjugated carbon-to-carbon double bonds, said monomer being selected from the group consisting of styrene, divinyl benzene, diallyl phthalate, glycidyl methacrylate, vinyl acetate, diallyl cyanamide, alkyl acrylates, methyl methacrylate, N-vinyl, N-alkyl guanidine (alkyl preferably ethyl), glycol dimethacrylate, diallyl maleate, diallyl fumarate, diallyl succinate, allyl idocyanate, triallyl phosphate, tetra allyl-silane, tetra allyl titanate and tetra allylsilicates.

Also component (3) as defined above may be blended as a mixture with component (1) and used in combination with an etherified melamine-aldehyde resin or an etherified urea formaldehyde resin to produce valuable resinous dispersions according to the invention.

Although alkyd resins have been emulsified in aqueous dispersions with the aid of certain strong dispersing agents, such as casein, alkali soaps and ammonium soaps, the oil-in-water emulsions produced have not been satisfactory as coating materials because of the extreme sensitivity of the dispersing agent to extraneous chemical reagents such as aldehydes, acids, salts of metals or fillers, etc., which causes the emulsion to be unstable. Further, it has been necessary to utilize a rather high acid number alkyd resin which is solubilized by forming an ammonium or amine salt in order to overcome the highly hydrophobic nature of the alkyd resin and thereby promote the dispersibility of the resin.

By introducing the oil modifier into the alkyd resin, the hydrophobic character of the resin is further increased, thereby requiring an even higher acid number to introduce sufficient solubilizing groups to provide a stable aqueous dispersion. The sensitivity of the resulting alkyd to additions of aldehyde, salts, fillers, etc., becomes further aggravated using the oil modified alkyd. More important, the film characteristics produced from the emulsion containing an alkyd resin having an acid number above 50, are much inferior to those obtained with a low acid number alkyd. The film is attacked easily by alkaline solutions or substances, weathers poorly, reacts with basic pigments or basic resin components, and in general is unsatisfactory for metal stoving finishes or for air drying finishes.

If a balance is struck between the use of higher amounts of strong dispersing agents and a lower acid number alkyd, the result is still unsatisfactory since the dispersing agent makes no contribution to the desirable physical characteristics of the film; instead it renders the film sensitive to moisture and alkali, weakens the strength and adhesion of the film, introduces undesirable discoloration and decomposition due to fungal attack or stoving treatment and frequently renders the emulsion wholly incompatible with other emulsified adjuvants, such as waxes, silicone resins, titanium ester resins and the like.

Surprisingly, the non-contributing or parasitic dispersant in the film is wholly eliminated in accordance with the present invention by virtue of the presence of from about ½ to about 2½ epoxy groups in each molecule of the dehydrohalogenated epihalohydrin ether of the alkyd resins to introduce reactive epoxy and hydroxy groups which fulfill the dual function of improving the dispersibility of the oil-modified alkyd without displaying any substantial reactivity towards deflocculants such as aldehydes, salts, acids or alkalis, and at the same time providing a thermo-setting cross-linking structure to improve the physical characteristics of the film. Since the dispersibility in water is enhanced regardless of the presence of alkali or acid, the epoxy and hydroxyl groups are thought to provide a non-ionic type of dispersion, which, surprisingly, has been found to be more effective in much smaller concentrations throughout a wide pH range than compared with the highly acid alkyd resins dispersed in strong ammoniacal solutions.

This non-ionic type of dispersing effect may have some connection with the remarkable compatibility of the epoxy alkyd resin for a great variety of widely different commercial resins. In contrast, the usual alkyd resin whether oil-modified or not, over a wide range of acid number, has only a limited compatibility, being substantially incompatible with certain desirable resinous additives which impart special properties to the cured finished composition, while the epoxy alkyd of the present invention is compatible with these resins, such as hydrophobic additives, the silanes and siloxane resins, tackifying additives such as certain of the liquid and low melting epoxy resins known as Epon resins and sold by Shell Chemical Company, or the titanate alkyl esters, gloss enhancing agents such as rosin, chemically modified rosins such as ester gum, maleinized gum, unsaturated fatty oils, etc., gloss reducing agents such as very finely divided butadiene-styrene polymer particles, butadiene-acrylonitrile polymers, and certain plastisols such as the vinyl chloride and vinyl chloro-acetate particle suspensions in non-volatile liquid ester plasticizers.

The foregoing additives, particularly the hydrophobic additives comprising the titanate alkyl esters, the silicone or siloxane resins and hydrophobic waxes may be chemically reacted with the compositions of the present invention to provide water dispersible or dispersed products of improved stability. For example, the oil-modified polyether polyepoxide alkyd resin from diethylene glycol and a mixture of maleic anhydride and phthalic anhydride copolymerized with polyvinyl acetate is subjected to an after treatment step of saponification, to provide additional polyvinyl alcohol groups chemically reactive with the silicone or the titanium ester mixture by heating the materials as a mixture or as an evaporated film at temperatures from 75°–225° C. Similarly, the use of an amphoteric or basic ingredient such as melamine-formaldehyde resin or vinyl alkyl guanidine, or diallyl cyanamide in small amounts as the conjoint monomer with the alkyd improves the compatibility with or may bring about chemical reaction in the presence of formaldehyde with waxes such as paraffine wax, microcrystalline hydrocarbon waxes, montan wax, carnauba wax, beeswax, formaldehyde condensation products of amides of fatty acids containing from 12–18 carbon atoms, such as methylene distearamide, etc. Quite small amounts of the conjoint polymerization product in the wax are suitable in producing lasting water repellency effects for treatment of fabrics, textiles and the like.

The present invention not only improves the stabilization of the liquid dispersions to obviate the need for any non-contributing stabilizers, but also widens the compatibility of the resinous products with desirable special additives of the type above mentioned. The novel polymerizable epoxy oil modified alkyd in conjoint polymerization with the ethylenically unsaturated comonomer produces unexpected compatibility with oils, waxes, and lattices while the usual commerical epoxy resins are for all practical purposes incompatible with alkyd resins.

Further, it is surprising that compatibility with relatively substantial amounts of drying, semi-drying and non-drying oils is obtained in view of the known difficulty of incorporating these materials in many of the usual synthetic vinyl type resins. Through the addition of still other resin materials such as nitrocellulose or methacrylate resins, for example, selected properties such as hardness and transparency may be improved.

Because of the introduction of the epoxy group into the oil-modified alkyd resin molecule, a new chemical means of improving the curing, adhesion and setting of the resin, particularly in the form of a film, is achieved, namely, through additional cross-linking of the epoxy groups to form three dimensional molecular networks which bring about chemical bonding to the substrate without the disadvantage of the evolution of water of condensation. By blocking the hydroxyl function of the oil-modified alkyd resin, the stability of the alkyd resin is remarkably improved, particularly with respect to such physical agencies as heat, light, oxygen, etc. and the resistance of the resin towards water is improved.

It is preferred that the alkyd resin be modified with a fatty acid having from 8 to 20 carbon atoms in the fatty acid molecule, and the amount of fatty acid employed in reaction with the polycarboxylic acid and polyhydric alcohol is limited to assure sufficient free hydroxyl groups which will permit the reaction with the epihalohydrin to provide about ½ to 2½ epoxy groups in each molecule of the polyhalohydrin ether recovered as the addition product in the first step of the process. In this manner the hydroxyl groups of the oil-modified alkyd resin, after dehydrohalogenation, are converted from a structural point of weakness in the resin molecule, into reactive epoxy groups which cross-link to form superior resinous products in the presence of known catalysts.

The epoxide products resulting from the dehydrohalogenation of the polyhalohydrin ether of the oil-modified alkyd resin, are characterized by the presence of epoxide groups, cyclic ether groups, wherein an ether oxygen atom is attached to two adjacent carbon atoms forming the cyclic structure, and at least two of said epoxide groups being linked in an ether linkage to a hydroxyl group in said alkyd resin molecule, thereby forming an oil-modified alkyd ether epoxide, and this latter term as used herein identifies the products of the invention.

The polyhalohydrin ethers are halogen compounds in a restricted sense, i.e. of chlorine, bromine and iodine or those compounds which may contain in addition non-reactive fluorine and which result from the condensation of the oil-modified alkyd resin and ½ to 2½ moles of the epihalohydrin. The epihalohydrin is preferably an alpha or 1,2-epihalohydrin, and produces a polyhalohydrin ether containing a non-cyclic ether linkage, a carbinol group and a halogen atom attached to a carbonatom adjacent to the carbinol group.

Upon treatment with a dehydrohalogenating agent, such as sodium aluminate, the halogen attached to the carbon atom adjacent to the carbinol group is removed and the hydroxyl of the adjacent carbinol atom is converted into the epoxide group.

The preferred polyether polyepoxide oil-modified alkyd resin is a short oil-modified resin. Exemplified with phthalic acid anhydride as the polycarboxylic acid, the resin contains from 40 to 50% of phthalic acid anhydride, and has a ratio of about 5 moles phthalic acid anhydride to 4 moles of glycerol to 2 moles of fatty acid. When the ratio becomes 1 mole phthalic acid anhydride to 1 mole glycerol to 1 mole fatty acid, the alkyd is a medium oil alkyd, range 30 to 40% phthalic acid anhydride and there are no longer free hydroxyl groups for reaction with epichlorhydrin.

The unmodified alkyd from phthalic acid anhydride and glycerol contains 2 hydroxyl groups for reaction with epichlorhydrin, but here the distinction in accordance with the invention is that the invention uses fatty acid in addition to phthalic acid anhydride and glycerol.

The unmodified alkyd from phthalic acid anhydride and glycerol is hard and brittle. The unmodified alkyd from maleic anhydride and ethylene glycol has undesirable gelling properties and is frequently too soft even in the converted stage to provide desirable products in the copolymerized mixture. The alkyd resin without modifiers from phthalic acid anhydride and glycerol is heat convertible to an insoluble, infusible stage but in this final stage has poor solubility in the usual hydrocarbon solvents. The 2:3 condensation reaction is difficult to control since the resin gels very rapidly and the product may contain large amounts of unreacted polyhydric alcohol and unreacted acid anhydride which renders the product sensitive to moisture, reactive with basic pigments and difficult to use. In the unmodified state, this alkyd is unsuitable for organic finishes.

As compared with the phenolic varnishes, the resin portion of the molecule in the alkyd resin is tougher and more durable than the resin portion of the oil-modified phenolic resin. Products of superior toughness and durability are obtained by modifying the alkyd resins with a smaller amount of oil than is required in the oil modification of the phenolic resins. A greater improvement in compatibility with other resins is obtained with a shorter oil modification of the alkyd resins than is achieved in the oil modification of phenolic resins. Although the most difficult alkyd resin to prepare is the short oil alkyd in the phthalic acid anhydride glycerol fatty acid group, techniques are now available to control the substituted amount and purity of the product to produce a highly satisfactory starting material for the invention.

The short oil alkyd resin reaches the gelation stage quite rapidly, more so than the medium and long oil lengths. This requires then a larger excess of glycerol in order to insure that a low acid number is produced in the finished product. After reaction, this excess is removed in making epoxy alkyd product of the invention. High acid number alkyds, acid number beyond 60, provide inferior films, and it appears essential that the acid number be preferably less than 60, for the reasons already mentioned. If too high an acid number of the epoxy alkyd is used, processing difficulty is encountered to defeat reproducibility in processing. Insofar as the epoxy reaction is concerned, the carboxyl group is reactive with epoxy to a certain degree which introduces an undesirable feature. Further, the high acid number alkyds have poorer drying properties and inferior exterior durability.

One of the most important properties of alkyds from phthalic acid anhydride is the excellent stability to heat and resistance to decomposition by ultra-violet radiation. This property is not shared by alkyd resins from aliphatic acids. For the coating use, the alkyd from phthalic acid anhydride is superior to the straight alkyd resin from the aliphatic polycarboxylic acids. This superiority is carried over to the oil-modified alkyds which are converted into polyether polyepoxides and polymerized with vinyl or allyl monomers in accordance with the invention.

The fatty acids used for modifying by esterifying the alkyd resin include saturated and unsaturated acids derived from drying, semi-drying and non-drying oils, such as vegetable oils and oils obtained from marine products. The unsaturated acids include those derived from fish oils, e.g., clupanodonic acid and those derived from cottonseed oil, linseed oil, China-wood oil, oiticica oil, soy bean oil, corn oil and other unsaturated vegetable oils. The unsaturated acids may include one or more of the following: arachidic acid, behenic acid, lignoceric acid, tall oil fatty acids, lauroleic acid, myristoleic acid, gadoleic acid, erucic acid, linoleic acid, oleic acid, linolenic acid, elaeostearic acid, licanic acid, arachidonic acid, etc. The saturated acids include lauric acid, myristic acid, palmitic acid and stearic acid. Hydroxy acids such as ricinoleic acid are very valuable modifiers for the alkyd epoxy polyether product, since they introduce an additional site of epoxy cross-linking function on the fatty acid chain in the oil modified epoxy alkyd product.

The modified alkyd resin may include polyesters such as the "reactive polyesters" based on linear alkyd resins (maleic or fumaric acid) with a reactive vinyl or allyl monomer, phthalic acid anhydride alkyd resins, carbic anhydride alkyd resins, petrex alkyd resins, citric alkyd resins, aconitic alkyd resins, tricarballylic alkyd resins, tetrachlorophthalic anhydride alkyd resins (fire resistance), the alkyd resin from linoleic dimer acid, the alkyd resin from the addition product of 1-pimaric and maleic anhydride, etc.

The alcohols may be glycol, diethylene glycol, propylene glycol, trimethylol propane, pentaerythritol, dipentaerythritol, sorbitol, mannitol, etc.

When aliphatic polycarboxylic acids are used in contrast with phthalic acid anhydride, the flexibility of the resin is increased. The resin from phthalic acid anhydride is harder and more brittle and is more highly crosslinked. One might say that the phthalic acid anhydride product is more like glass whereas the product from the dibasic acids, succinic through sebacic, maleic and fumaric are more like rubber.

In general, non-drying oils act as permanent plasticizers whereas oxidizing oils tend to harden on aging unlike the non-drying oils. The compatibility of the oil-modified alkyd polyether epoxide with oil increases with increasing oil length but there is no need to reduce phthalic acid anhydride below about 23% since this long oil or medium-to-long oil alkyd blends well with oil by mere mixing. The epoxide alkyds which are shorter in oil than 38% phthalic acid anhydride generally require aromatic solvents (xylol) for solubilization whereas the product containing from 35% to 39% minimum phthalic acid anhydride content, the solvent may be mineral spirits. The percentage of resin solids in solution may be 50% for medium oil and 50% for short oil in xylol and/or hydrocarbon but generally the short oil epoxy alkyd resin and conjoint vinyl or allyl polymer in a hydrocarbon solution of the same alkyd resin concentration is more viscous than the medium oil modification of this alkyd resin.

In industrial coatings which are force dried or baked at elevated temperatures, non-drying oils and semi-drying oils are preferred modifiers due to their improved color, superior film forming properties, improved plasticizing function imparting greater flexibility to the film, and improved resistance against deterioration by oxygen, ultraviolet light and water.

Surprisingly, comparison between a short oil lauric acid modified alkyd component (phthalic acid anhydride) and this same alkyd modified to form the new epoxy polyether of the invention, discloses that the conventional alkyd is so slow drying, so soft and has such poor film forming properties that it canont be satisfactorily used as the principal film forming resin ingredient whereas the epoxy polyether forms an excellent film through the cross-linking reaction in the presence of an epoxy cross-linking catalyst.

In architectural finishes, the oil modifier for the epoxy polyether alkyd resin of the invention may desirably be an unsaturated oil or a treated oil, such as styrenated oils, copolymer oils, synthetic oils or the like, but it is preferred that a minor amount of the modified oil (heat treated, blown, dimerized, etc.) be employed in lieu of the unsaturated oil or acid which is replaced by said minor amount. It is desirable to produce products which are not too viscous in an organic solvent solution, which are uniform and of high resin concentration and which overcome the prior art difficulties of wrinkling, checking and shrinkage due to the action of oxygen and peroxides in the aging of the film.

Tung oil, for example, provides improved heardness and durability and permits controlled after-hardening of the film in the presence of metallic driers. Tung oil improves water and alkali resistance but the color is darker and processing is a little more difficult. Because of the reactivity of the tung oil acids, it tends to gel readily and is used for wrinkle finishes. For unwrinkled or smooth finishes the tung oil modifier is used in admixture with oil acids of less reactivity and there is obtained, thereby, an improvement in color and smoothness.

The wrinkling, checking and shrinkage which is present in the ordinary use of tung oil, oiticica oil, linseed oil alkyd combinations, is reduced by blocking the hydroxyl groups which usually react under heat to evolve water and which introduces further unsaturation reactive with atmospheric oxygen in the ultimate film.

Although the short oil alkyd resin starting materials used in making the epoxy alkyd component of the invention have been generally characterized in terms of known commercially available materials, and these do include such materials as the non-oxidizing Reyzl resins, 50–5, 99–5, 99–4–60, and the oxidizing Reyzl resins 387–5, 310–5, etc. which are furnished by the American Cyanamid Company, it has been found that the starting material is desirably substantially free from unreacted glycerine which serves to contaminate the ultimate product and which prevents the desired elimination of hydrogen halide in the dehydrohalogenation reaction.

When semi-drying soy bean oil acids are used in medium or short oil alkyds chemically modified in accordance with the invention, the film is slower air-drying and requires longer baking than tung oil but it has good flow and leveling properties immediately after application.

Exterior durability for architectural finishes and greater flexibility is improved by increasing the oil lengths from the short oil length towards the medium oil length in the epoxy product. However, if the oil acids are from linseed, the yellowing property may persist to render the alkyd unsuitable for pure white finishes and mixtures of saturated and unsaturated fatty acids are used.

Replacing part of the glycerol with pentaerythritol increases durability but makes the processing control more difficult, and makes it difficult to produce reproducible batches essential in commercial practice. Only a relatively small part of glycerol is replaced.

Accordingly, the starting short oil modified alkyd resin is carefully dried to remove moisture, and freed from olcohol including glycerol. If glycerol is present it is removed by known processes of extraction using non-alcoholic inert solvents, such as xylol, petroleum solvents and the like to ensure proper anhydrous conditions for the condensation with epihalohydrin in the addition reaction.

The starting alkyds are characterized by the high hydroxyl (OH) values and low acid values. The following values indicate preferred values for the starting material:

| Percent fatty acid | Acid number | Hydroxyl number | Type of fatty acid |
|---|---|---|---|
| 15-50 | 1-60 | 20-110 | Hydroxy fatty acid or oil. |
| 20-45 | 1-60 | 30-100 | Saturated fatty acid or oil. |

Up to 50% castor oil acids and up to 40% of saturated or unsaturated acid without the hydroxyl function provides at least 2 or more hydroxyl groups in the molecule and can be made to have a hydroxyl number of up to 100 to 110, uncorrected for free glycerol. By extracting glycerol, the hydroxyl number drops about 5 to 10 points. The glycerol-free starting alkyd has a hydroxyl number which ranges from 20-90 with an acid number of 1-20.

Epoxy cross-linking catalysts suitable for use in converting the short oil modified epoxy alkyd resin of the invention to the thermoset state include alkalies, alkaline reacting substances, acids, alkaline reacting salts, basic nitrogen compounds, and the like such as sodium hydroxide, potassium hydroxide, calcium oxide, ammonia; alkali phenoxides like sodium phenoxides; carboxylic acids or anhydrides such as formic acid, oxalic acid or phthalic anhydride; Friedel-Crafts metal halides like aluminum chloride, zinc chloride, ferric chloride, or boron trifluoride, as well as complexes thereof with ethers, ketones, diazonium salts, etc.; phosphoric acid and partial esters thereof including n-butyl orthophosphate, diethyl orthophosphate and hexaethyl tetraphosphate; and amino compounds such as dimethyl amine, trimethyl amine, triethyl amine, ethylene diamine, diethyl amine, diethylene triamine, dimethylaniline ethyl piperidine, triethylene tetramine, dimethyl amino methyl phenol, pyridine, piperidine, N,N'-diethyl-1,3-propanediamine, dicyandiamide and its formaldehyde condensation products, melamine and its formaldehyde condensation products, fatty acid salts of amines and the like. The amounts vary considerably depending upon the particular agent employed. For the alkalies or phenoxides, 2 to 4% is suitable. With phosphoric acid and esters thereof, good results are obtained with 2 to 7 percent added. The amino compounds are used in amounts of about 5 to 15 percent and the others in general involve addition of about 1 to 20 percent. As little as 0.25 percent of potassium hydroxide, or an equivalent amount of dimethylaminomethyl phenol, 0.675 percent; or of triethylamine, 0.45 percent, or of trimethylamine, 0.26 percent, is effective for accelerating the reaction.

The cured resinous oil-modified epoxy alkyd conjoint ethylenic polymer products are also of value in the preparation of hard infusible coating compositions when combined with other curing agents, under anhydrous conditions, such as the diisocyanates, ureaformaldehyde resins, dialdehydes or polycarboxylic acids.

Upon the addition of the curing or hardening agent, the composition may begin to cure and harden even at ordinary temperature.

A further use of the oil-modified epoxy polyether alkyd resins lies in formulations with conventional epoxy resins, including the epoxy resins which are modified with one or more of the urea resins, phenolic resins, melamine resins, etc. Also, new and useful mixtures are obtained with acid esterified epoxy resins, and the styrenated epoxy resins.

As adhesives, these mixed resin formulations can include a conventional liquid epoxy resin, such as Epon 582 having an epoxy equivalent of 190–210, or Epon 562 having an epoxy equivalent of 140–165 (Shell Chemical Company), as the polymerizable carrier for a significant amount (25–60%) of the oil-modified epoxy polyether alkyd of the present invention. These Epon resins 562 and 582 are the epichlorhydrin condensation products of glycerol, epoxidized by removing HCl.

If the epoxide curing agent is added to the epoxy polyether of the oil modified alkyd resin just prior to its application as a coating material dissolved in a polymerizable solvent, or as a laminating adhesive with a high resins content and low volatiles content, such resin composition as a polymerizable composition provides valuable advantages in the great variety of useful application techniques which are available as a result of the reactivity of the resin mixture.

Higher concentrations of the active polymerizable resin composition are available in the polymerizable solvent dispersion, at lower viscosity, before cure, thereby permitting precise control of the amount of resin required for the particular use. This results in improved adhesion to the base which is coated, without the disadvantage of lowered water, alkali and acid resistance in the conventional alkyd having unblocked hydroxyl groups.

Certain resins which are incompatible with conventional epoxy resins (the condensation polymers from 4,4'-dihydroxy diphenyl methyl methane and epichlorhydrin, the so-called epoxy or Epon resins), have improved compatibility with the polymerizable epoxy alkyd resin mixtures of the present invention.

By blending the epoxy bisphenol resins with the liquid polymerizable epoxy polyether oil-modified alkyd resin mixtures in appropriate amounts, preferably before curing, there are obtained improved air drying and baking coatings. Improved compatibility is also exhibited with nitrocellulose (½ second), ethyl cellulose, polyvinyl acetate-chloride resins, ester gum and maleic ester gum. The compatibility is even better before curing, and such compatibility cannot be attained with the bisphenol epoxy or Epon resins. There is improved compatibility with the conventional medium and long oil alkyd resins, the styrenated alkyd resins and the rosin modified phenolic resins, than is observed with the conventional bisphenol epoxy resins. With these latter alkyd types, both nitrocellulose and amine resins may be added to make superior baking finishes for metal coatings, such as automobile lacquers.

Upon introducing the curing agent in the mixed epoxy resins just mentioned, a wide variety of polymerizable laminating and casting adhesive formulations are made available. The advantages of good chemical resistance, high flexibility, good adhesion and good color are either maintained or improved with respect to one or more of these properties, depending upon the proportions employed, and the specific materials being bonded.

For the bonding of molded or cast resin pieces particularly, such mixed adhesive compositions provide beneficial results. In the fabrication of coaxial high frequency transmission lines, these compositions as adhesives may be employed to good advantage in assembling low impedance metal to plastic joints.

However, the epoxy oil-modified alkyd resin component need not have too low an acid number. Acid numbers may be as high as 50–60 and oil-modified aliphatic polyesters may be employed as the starting material for preparing the epoxy polyether product, but the free alcohol (glycol or glycerine) content before dehydrohalogenation is preferably kept at a minimum, in order to reduce the chlorine content of the product.

The mixed polymers and copolymers are obtained by employing peroxide or ammonium persulphate catalysts, in a small amount of about 1–20 parts per 1000 parts of mixture. The peroxide catalysts include hydrogen peroxide, benzoyl peroxide, phthalic peroxide, tertiary butyl peroxide, acetyl peroxide, lauroyl peroxide, alkyl hydro peroxides and cyclo alkyl hydro peroxides such as 1-hydroxy cyclohexyl hyperoxide-1, tertiary butyl hydro peroxide, etc.

In general, there is dissolved from about 1 to 20 parts of the oil-modified epoxy polyether alkyd resin in about 20 parts of the vinyl or allyl monomer, a small amount of the epoxy curing catalyst is added to cross-link the alkyd resin and the monomer compositions.

The monomers may also be used in mixture with each other as comonomers. The epoxy catalyst tends to stabilize the peroxide catalyst producing less decomposition than is found in the usual polyester-vinyl monomer peroxide polymerization, as evidenced by improved color.

As a casting, laminating or adhesive resin, and employing conventional polymerization techniques, it is desirable to employ low polymerization temperatures, for example about 40° C. for vinyl acetate, 80° C. for styrene, 60° C. for methyl methacrylate, 45° C. for diallyl cyanamide, 70° C. for diallyl phthalate and diallyl maleate, etc. and to provide efficient jacketed cooling about the mold or impregnated fabric lay up to prevent overheating and bubble formation.

In casting operations the more exothermic polymerizing monomers may be cast in thinner sections in order to provide better temperature control and multiple casting or coating operations may provide a more uniform product. Ultra-violet light as well as heat accelerates polymerization. Infra red as well as ultra-violet lamps may be used in laminating operations. To exclude atmospheric oxygen, a sheet of heavily plasticized cellophane may serve to cover a fibrous sheet material which is impregnated with the comonomers in solution of the epoxy alkyd resin, vinyl or allyl monomer and catalysts. Superimposed sheets of paper, cloth, glass fibers, nylon, etc. may be bonded at low pressure by such techniques.

Before the copolymerization is complete it may be convenient to add a soluble drier, such as napthenate of cobalt, manganese, chromium, copper, nickel, cadmium or lead or mixtures of these. The drier may suitably be added during laminating operations at any time before the resin mixture has polymerized to a tacky gel stage or even just short of the infusible state, with an improvement of the cure obtained throughout the cross-section of the laminated or cast resin material.

Since some of the amines used as the curing agent for the epoxy oil-modified alkyd resin act as inhibitors for the copolymerization of said alkyd and also inhibit the polymerization of the allyl or vinyl monomer, the inhibiting type curing agent for cross-linking the epoxy alkyd resin is added to cross-link the alkyd before said alkyd is dissolved in the monomer. The curing agent may then be washed out of the cured alkyd to remove inhibitor before being introduced into the peroxide catalyzed polymerization mixture. In certain cases, an excess of peroxide catalyst is effective to overcome the inhibiting effect of certain amine catalysts. A third alternative is to employ an epoxy cross-linking tertiary amine which is a promotor for the free radical polymerization catalyst used in the polymerization of the substituted ethylene monomer and the epoxy polyether of the oil-modified alkyd resin. The amine forms a catalytically effective redox system for the free radical polymerization of the monomer-alkyd droplets in aqueous dispersion and produces resinous products of better physical properties, and higher molecular weight in a shorter period of time at lower temperatures. At the same time the alkyd component is partially cross-linked so that the liquid droplets are readily converted into stable gel structures having intermediate thixotropic properties of plasticity and rigidity. The size of the particles is readily controlled by controlling the addition of the alkyd and monomer to the aqueous redox reaction bath. As shown in the examples, a particle size of 0.5 micron or less produces stable emulsions which form redispersible powders upon the removal of water. The particle size may be increased to 60, 80, 100, or 200 mesh by reducing the agitation and controlling the drop size during the dropwise addition of the alkyd and ethylenic monomer. Improved results in the control of the particle size in the suspension polymerization are obtained with the tertiary amine promoters such as dimethyl aniline, N-methyl piperidine, N-methyl morpholine, tributyl amine, methyl hydroxyethyl aniline, dimethyl paraanisidine, dimethyl paratoluidine, etc. As little as 0.5% and up to 20% by weight calculated on the monomer of these amines increases the polymerization velocity. A smaller amount of the amine equal in weight to the peroxide catalyst is quite effective and reduces the tendency towards discoloration, thereby permitting even less coloration than with the peroxide alone or with mercaptan promoters. The smaller amount of amine likewise produces only a partial cross-linking of the alkyd component and permits the introduction, subsequent to polymerization, of up to 20% of latent curing catalyst such as dicyandiamide, N-vinyl N-alkyl guanidine sulfate or phosphate, or hexahydro 1,3,5 triacryl s-triazine, which become activated at stoving temperatures of 95–150° C. To these formulations, there is desirably added up to 45% of a butanol solution of a butylated melamine-formaldehyde resin. The evaporation of the emulsion with the above additives, using vinyl acetate, styrene, methyl methacrylate or diallyl phthalate as the monomer, the monomer to epoxy alkyd ratio being about 1 to 4, provides a water or waterbutanol redispersible emulsion which is stable provided that the particle size of the polymer is less than about 1.0 micron.

The polymerization reaction is conveniently carried out under an inert gas such as carbon dioxide or nitrogen, the gas being passed over the surface to sweep the reaction mixture free from oxygen or being bubbled through the liquid reactants. Otherwise the color of the product may be darkened in an undesirable manner.

The epoxy aliphatic alkyd resins preferred are those derived from the low molecular weight aliphatic polycarboxylic acids (maleic, fumaric, succinic, adipic, citric, carballylic, citraconic acids), and from an alkylene glycol having 1 to 4 carbon atoms in the chain of glycerol. The acid number may be as high as 50–60 but lower acid numbers, less than 20 (5–15), have better resistance to alkali, acids and water are therefore preferred.

Mixed epoxy polyether aliphatic polyesters may be employed; 20% lauric acid modified ethylene glycol adipic ester, 20% stearic acid modified glycol fumaric ester and 15% ricinoleic acid modified glycol maleic ester can be converted into the epoxy products by the same procedure as set forth in the above example to form emulsifiable products useful in coating and textile finishing applications. The polyester starting materials for these products suitably have an acid number of less than 5 and a hydroxyl number of about 40–60.

However, if a higher acid number is used, up to 25 or 30, the epoxy products which are polymerizable with peroxide catalysts have improved compatibility for polyvinyl alcohol, and nitrocellulose when dissolved in a vinyl or allyl monomer, such as styrene, vinyl acetate or diallyl phthalate, and polymerized. This last named polymerization can be effected in bulk, in a solvent or by dispersing the ingredients in a persulphate peroxide catalyzed aqueous suspending medium, in which additional emulsifiers and wetting agents serve to control the uniformity of polymerization, the degree of polymerization and the particle size of the latex particles or of beads which are produced.

As the proportion of aliphatic polycarboxylic acid increases in the oil-modified polyester, the products become more flexible and rubbery and somewhat lower melting during the fusible stage before introducing epoxy group.

If it is desired to further augment the flexible character of the resin, one may do so by blending the resin solutions with polyamides from ethylene diamine and dimerized unsaturated fatty acids, or butadiene styrene polymer latices, a preferred example of the latter is a latex containing high styrene (about 65%) to low butadiene (about 35%) polymerized in the presence of an amine activator and non-anionic emulsifiers in an alkaline aqueous medium. The latex combination compatible with many of the standard rubber base latex paints confers improved properties to these particularly as a result of the benefits contributed by the epoxy-modified, oil-modified alkyd of the present invention.

By adding an amine curing agent, such as triethylene tetramine, and pigment to the conjoint polymer mixture in a solvent, good baking lacquers dilutable with butanol, chlorbenzene and the like are obtained which have good resistance to temperatures of about 100–110° C. Such lacquers may be blended with styrenated bodied linseed oil, or bodied oil modified alkyd resins as shown in U.S. 2,586,092, to form water paints of good gloss, or a butanol solution of 40% butylated melamine formaldehyde resin or butylated urea resin.

Also, titanium esters may be added, such as basic tetravalent titanium acylates as disclosed in Langkammerer Patent U.S. 2,489,651, or esters of titanium such as the tetrabutyl ester where improved heat resistance and corrosion resistance are desirable.

In order that those skilled in the art may better understand how the present invention can be carried into effect, the following examples are given by way of illustration and not by way of limitation. All parts and percentages are by weight.

EXAMPLE 1.—PREPARATION OF POLYETHER POLYEPOXIDE OIL MODIFIED ALKYD RESIN (A) *Reaction of alkyd with epichlorhydrin (SnCl₄ catalyst)*

To a glass reaction vessel equipped with a stirrer, reflux condenser, thermometer and drying tubes at all outlets, and chilled with an ice salt mixture, the following were added in the order named:

| | Parts |
|---|---|
| 52.4% alkyd in anhydrous xylol (anhydrous short oil alkyd from 2 moles of lauric acid and 5 moles phthalic acid anhydride and 4 moles of glycerol containing 47% phthalic acid anhydride, 33% fatty acid and about 20% glyceryl residue acid value 5.5) | 429.8 |
| Epichlorhydrin (98% purity Shell Chemical Co.) | 23.6 |
| Anhydrous SnCl₄ in anhydrous xylol (20% solution) | 1.31 |

At 2° C., the epichlorhydrin was added to the alkyd dissolved in xylol, and the SnCl₄ in xylol was added dropwise with stirring over a 10 minute period. The temperature rose and the reaction mixture was warmed first to 30° C., with stirring and then to 90° C. The reaction was continued for ½ hour, the temperature rising to 180° C. The SnCl₄ excess was decomposed with 1.1 parts of sodium carbonate, the mixture stirred an additional 10 minutes and then filtered over a Celite mat to remove decomposed xylol-insoluble matter including catalyst. Xylol was removed under vacuum. 77.5 parts of the starting alkyd were converted into 83.3 parts of the xylol-free epichlorhydrin reaction product having an acid number of 5.2. This indicates the addition of 5.8 parts of epichlorhydrin whereas the addition of 7.9 parts is the theoretical yield. Percent Cl=2.0% (56.3% resin in xylol). Viscosity Z–1 Gardner scale, starting viscosity Z–3.

(B) *Dehydrohalogenation of the chlorohydrin addition product (sodium aluminate catalyst) to form epoxy alkyd*

Sodium aluminate, Nalco 680, from the National Aluminate Corporation having the following composition:

| | Percent | Mols |
|---|---|---|
| Na₂Al₂O | 72 | 0.439 |
| NaOH | 5.3 | 0.132 |
| H₂O (by difference) | 22.7 | 1.26 |
| | 100.0 | | was heated in a Coors crucible over a Mekker burner. Ignition was continued for an hour. The weight loss was 22.0%. The material was pulverized and stored in a desiccator.

To a 3 necked flask were added 60 parts of 56% solution of the product from A in xylol. After addition of 20 parts by volume of dioxane, the solution was chilled to about 32° F. 1.8 parts of catalyst ("Nalco 680 dried") were ground in about 15 parts of dioxane and the pulverized catalyst was washed into the chilled flask with vigorous stirring. Three drops of water were added (approximately 0.17 part) to the stirred mixture and the temperature rose from 32° F. to 38° F. With constant stirring the contents of the flask were heated between 198° F. and 210° F. for a period of 1½ hours, at which time heating was discontinued.

The clear solution was separated from the precipitate present by suction filtration through a Büchner funnel using a Celite mat. Using pH papers (moistened with water) the pH was found to be in the range 6 to 7. To free the epoxy alkyd as the alkyd acid (instead of the sodium salt of the alkyd), a portion of AlCl₃ was added to the stirred xylol-dioxane solution of epoxy alkyd followed by 5 drops of water. After stirring for 15 minutes, the solution was dried with anhydrous sodium sulphate and suction filtered with the aid of a Büchner funnel and Celite mat. As the pH was about 5, two drops of propylene oxide were added to take up any free HCl present due to AlCl₃ and H₂O, and the pH rose to between 6 and 7.

The material was freed from xylol under vacuum (water aspirator pump) with most of the distillate coming over in the range 31° C. to 40° C. at a bath temperature of 68° C. to 87° C. The pH of the vacuum distillation residue, epoxy alkyd was between 5 and 5.5.

The quantity of the vacuum distillation residue, the epoxy alkyd, was 48.6 parts, which at 59.2% solids, corresponds to 28.8 parts of 100% solid resins. About 2% of the original solution was lost as chloride during the dehydrohalogenation. In 60 parts of starting material at 56% solids we have 33.6 parts of 100% resin, from which 1.2 parts is lost as HCl, leaving 32.4 parts as the theoretical quantity of product to be expected. Thus the yield is: 89% yield. The epoxy resin product gelled at room temperature upon treatment with an amine curing catalyst, triethylene tetramine, in an amount of about 5% by weight of the product. The epoxy resin product has an epoxide value of 1060 and at an average molecular weight of 1500–2500 the number of epoxy groups per molecule vary from 1.6 to about 2.6. A substitution with as little as ½ epoxy group to 1.6 produces beneficial curing effects along the lines as set forth in this example.

EXAMPLE 2

Example 1 was repeated except that the starting alkyd resin before reaction with epichlorohydrin was extracted to free it from glycerol in accordance with the method of Wright and Du Puis; in the article "Paint Manufacturer," November 1945, pages 76–80. Methanol or ethanol were used as the solvents in successive runs with equally good results.

After solvent extraction the residual glycerol-free alkyd material was taken up in an inert anhydrous higher boiling solvent such as xylol, and the alcohol removed from the solvent solution to provide an anhydrous alcohol-free solution of the glycerol-free alkyd in a condition suitable for the addition condensation with epichlorhydrin using the Friedel-Crafts catalyst, $SnCl_4$. About 6% (5.5%–6.3% in various runs) of glycerol as free glycerol is removed and about 45–50% of extractable material was removed by the extraction of the alkyd.

Repeating the epichlorhydrin condensation process and using the same relative amounts as set forth in Example 1, the recovered addition product (percent Cl= 1.8%) was subjected to the dehydrohalogenation treatment as set forth in Example 1 and the epoxy alkyd recovered was free from chlorine, lighter in color and showed better stability than the product of Example 1.

Equally good results in the example above are obtained in the epichlorhydrin addition reaction when anhydrous zinc chloride is used as the Friedel-Crafts catalyst. Other catalysts may also be used such as boron trifluoride and ferric chloride. The temperature of the addition condensation may be suitably varied from 75 to 125° C. but a temperature range of 90–115° C. is preferred.

In the dehydrohalogenation reaction instead of sodium aluminate, or potassium aluminate, anhydrous sodium or potassium zincate and somewhat less effectively, anhydrous sodium ortho and meta silicates may be used. The temperature of dehydrohalogenation is usually of the order of 75–105° C.

EXAMPLE 3

A 35% soya-bean medium oil alkyd was prepared by heating together soya-bean oil acids, phthalic acid anhydride and (5% excess) glycerol, in the required amounts at 180° C. for 1 hour, at 235° C. for 1 hour and was held at 235° C. until the acid number was 12 at which time the resin was poured.

The resin was extracted to remove free glycerol as in Example 2 taken up in xylol, freed from alcohol and reacted first with epichlorhydrin and then with sodium aluminate as in Example 1. The hydroxyl number of the starting alkyd was about 90 and the acid number was about 12.

EXAMPLE 4

Using the procedure of Example 3 a 30% linseed oil modified alkyd was made having an acid number of about 14, and after extraction to remove free glycerol, the hydroxyl number was about 97 and the acid number 13. The anhydrous alcohol-free alkyd condensed with epichlorhydrin and dehydrohalogenated provided a reactive cross-linkable product capable of producing good films.

Following the procedure of Example 2 the polyepoxide polyethers of oil-modified alkyds from the following alkyds were made;

(A) 35% lauric acid, phthalic acid anhydride and glycerol (85%), pentaerythritol (15%), acid number 10, hydroxyl number 95.

(B) 30% ricinoleic acid, phthalic acid anhydride (½ mole) maleic acid anhydride and glycerol, acid number 20, hydroxyl number 100.

(C) 30% lauric acid, phthalic and anhydride (½ mole), furamic acid (½ mole) and diethylene glycol, acid number 15, hydroxyl number 40.

(D) 30% lauric acid, 20% adipic acid anhydride, 80% phthalic acid anhydride glycerol, acid number 15, hydroxyl number 40.

(E) 20% lauric acid, phthalic acid anhydride, 80% glycerol, 10% diethylene glycol, 10% pentaerythritol, acid number 5, hydroxyl number 60.

(F) 35% ricinoleic acid, fumaric acid, 50% phthalic acid, 50%, 90% glycerol, 10% diethylene glycol, acid number 10, hydroxyl number 85.

(G) 25% lauric acid, maleic acid anhydride, ethylene glycol, acid number 25, hydroxyl number 40.

(H) 20% lauric acid, 90% phthalic acid anhydride, 10% adipic acid, acid number about 9, flow point of 65° C.

(I) 20% lauric acid, 80% phthalic acid anhydride, 20% succinic acid anhydride, acid number 5, hydroxyl value 45.

The flexibility, hardness after cure and heat stability of the mixed polyesters containing fumaric acid and/or phthalic polyesters is better than the linear maleic acid polyester. About 20% of the (lauric) fatty acid was found suitable to impart beneficial oil compatibility properties and was the minimum used in all of the preparations of the examples.

EXAMPLE 5

In the following example, conjoint polymers were prepared with the following monomers (a) vinyl acetate, (b) styrene, (c) diallyl phthalate, and (d) methyl methacrylate and with the epoxy alkyds of Examples 1–4. Conveniently, 5 parts of the monomer and 20 parts of the alkyd are mixed and the mixture is added dropwise to 50 parts of water in which is dissolved about 0.2% benzoyl peroxide about 0.2% of dimethyl aniline and about 0.1% of a non-ionic emulsifier, a polyethoxy derivative of p-tertiary butyl phenol containing at least 40 ethoxy groups in the side chain.

For the polymerization of the conjoint polymer with (a) vinyl acetate, a temperature of 45 to 60° C. was used, for (b) styrene, a temperature of 45 to 80° C., for (c) diallyl phthalate, a higher temperature of 75–85° C. was used, and for methyl methacrylate a temperature of 45–70° C. was used.

Under rapid agitation and dropwise addition, the dispersed particles of polymerizable oil in water were found to have an average particle size of less than 1.0 micron and in most cases less than 0.5 micron, thereby providing stable dispersions which contain up to 50% of the polymer in suspension.

Suspension of the conjoint polymers from (a) vinyl acetate were hydrolyzed (saponified) with a dilute alcoholic potassium hydroxide solution (20% KOH) until about 70–80% of the acetate groups were hydrolyzed to hydroxyl groups. By using a calculated excess of about 100% of KOH, the hydrolysis is accomplished at temperatures below 50° C. in about ½ hour, the alkali is neutralized with mineral acid (hydrochloric acid) and the emulsified product is found to be capable of being evaporated to dryness under vacuum and at temperatures less than 50° C. and redispersed in water to provide a stable dispersion.

By reducing the amount of vinyl acetate to about 3 parts of acetate per 20 parts of epoxy alkyd resin, this dispersibility property remains.

The evaporated vinyl acetate product is compatible with butylated melamine-formaldehyde resin, butylated urea-formaldehyde resin of the composition shown in Hovey, U.S. 2,109,291, and with the dispersible siloxanes as shown in Green, U.S. 2,702,276. Also titanium esters, inorganic or organic, may be added to the dispersions and heated for short periods of time up to 100° C. to increase the adhesiveness of the resin material. Thus, about ⅓ part of titanyl sulfate, tetrabutyl orthotitanate, or titanium lactate per part of polyvinyl acetate used in the conjoint polymer provides a definite enhancement of the adhesiveness of the resulting film; this adhesiveness is further improved by heating the coating applied to wood, metal or cloth, at temperatures up to 130° C. for 5–15 minutes. Tough selfsupporting films may be cast this way and stripped from glass.

By adding about ½ part of carbowax or glycerine per part of evaporated conjoint alkyd polymer from polyvinyl acetate and the dispersible polysiloxane of U.S. 2,702,276, valuable water repellant compositions are produced which may be diluted with water to provide valuable stable emulsions for textile treatment. Films deposited from such emulsions when heated to 135° for about 5 minutes appear to become translucent and there is an indication of chemical reaction between the siloxane groups and the epoxy and hydroxyl groups of the polymer. This is further accelerated by incorporating about 5% based on the weight of the epoxy alkyd of a latent epoxy cross-linking agent such as cyanamide or a more rapid acting catalyst such as triethylene triamine.

The conjoint polymers with styrene are much more hydrophobic than the polymers with vinyl acetate. These are suitable for the preparation of cation exchange resins by sulfonation; however, the particle size is increased to about 60–100 mesh during the suspension polymerization by slowing the agitation and by adding the alkyd and monomer more rapidly.

Clear glass-like beads of the mixed polymer of the epoxide modified and alkyd modified resin and styrene which is polymerized in the presence of styrene and being 1–2 mm. diameter may be sulfonated to introduce 0.5 to 1.05 sulfonic groups in the styrene molecule of the conjoint polymer using chlorsulphonic acid or concentrated sulphuric acid or oleum.

The methacrylate conjoint polymers may be converted into carboxylated cation exchange resins by saponification using about 5% alcoholic KOH. However, it is preferred to use the conjoint polymers in combination with melamine-formaldehyde and urea-formaldehyde dispersions to make superior aqueous coating compositions as shown in the next example.

EXAMPLE 6

The conjoint polymers epoxy-modified, oil-modified alkyd resin with (a) polyvinyl acetate, (b) styrene, (c) diallyl phthalate, and (d) methyl methacrylate were mixed with butylated melamine-formaldehyde solution containing about 75% of hexamethylol melamine butyl ether in butanol. About 30 parts of a 40% emulsion of the conjoint polymers were emulsified at about 85–95° C. with 12 parts of said butylated melamine solution. About 3 parts of a slow acting catalyst, dicyanamide, was added during the emulsification process. The concentration was adjusted under rapid stirring to about 30% solids and a plurality of aluminum strips were coated with these emulsions, the coatings permitted to air dry and thereafter baked for ¼ hour at 180°–200° C. to provide a hard lacquer coating. The methacrylate and styrene conjoint polymers flowed more than the diallyl phthalate polymer and could be satisfactorily baked at lower temperatures.

Those conjoint polymers containing larger amounts of phthalic anhydride appeared to be harder and of better color than those containing larger amounts of the aliphatic dicarboxylic acids. Melamine-formaldehyde containing stoving lacquers were harder and of better color than the urea-formaldehyde lacquers with the conjoint polymer.

All of the butylated melamine-formaldehyde mixtures with conjoint resin gave excellent films on stoving. All produced more or less stable dispersions and all could be evaporated and redispersed, but the best dispersions were obtained from the hydrolyzed polyvinyl acetate conjoint polymers.

To each of the lacquer compositions there can be added suitable pigments—for example, phthalocyanine pigments, or azo pigments or inorganic pigments such as iron oxide, chrome yellow, titanium dioxide, or mixtures.

It is preferred that when an organic pigment be used, it be added to the butanol solution of the melamine-aldehyde, for example 2½ to 5 parts of pigment, and then when the melamine resin and conjoint polymer are emulsified, the pigment migrates to the aqueous phase to give uniform color.

Thickeners, such as methyl cellulose, may be added. A similar thickening action is obtained by adding solvent solutions of other resinous additives, such as the commercially epoxy resins, the glycidyl ethers of bisphenols in chlorbenzene or cyclohexanol, or a linseed oil solution of rosin, etc.

Although the preferred example of suspension polymerization in Example 5 shows the partial cross-linking of the polyepoxy short oil alkyd during the tertiary amine activated peroxide polymerization, equally good suspensions but of differing epoxy reactivity are obtained by other redox polymerization catalysts, for example, lorol mercaptan and benzoyl peroxide. Also azo catalysts, such as azo diisobutyronitrile are useful, particularly where basic monomers such as diallyl cyanamide or N-alkyl (ethyl) N-vinyl guanidine are employed. In these polymerizations about 5 parts of the monomer are used with 20 parts of the polyepoxy alkyd and the monomer exerts a perceptible cross-linking or hardening action even during the polymerization at temperatures of 75–95° C. These latter compositions are particularly desirable as water repellent coatings since they serve to disperse up to 20 times their weight of wax or fatty acid amides and aldehyde reaction products of these amides to provide valuable aqueous dispersions for textile treatment.

The cation exchange resin materials and the polyvinyl alcohol products above exemplified have a further unusual utility in loosely combining with astringent aluminum salts, such as aluminum oxychlorohydrate and aluminum hydroxide, to thereby provide good antiperspirant compositions. Equal parts of the resin product and astringent in the presence of an inert diluent (talc, bentonite, etc.) provide desirable results in astringent powders. These powders may be blended with an unguent salve (water soluble sorbitans) to provide an astringent paste.

I claim:

1. An emulsion coating composition containing water as the dispersing phase and a heat reactive polymer in the oil phase, said heat reactive polymer comprising a member selected from the group consisting of a mixed polymer of an epoxide oil-modified alkyd resin prepared by the dehydrohalogenation of an epihalohydrin ether addition product of a short to medium oil-modified alkyd resin containing from 8 to 20 carbon atoms in the fatty acid molecule, an acid number below 60 and sufficient free hydroxyl groups to provide by reaction with said epihalohydrin to provide about ½ to 2½ epoxy groups in each molecule of said polyether epoxide oil-modified alkyd resin and a vinylidene monomer containing at least one $CH_2=C=$ grouping but having no conjugated carbon to carbon grouping and a mixture of said mixed polymer with said polyether epoxide oil-modified alkyd resin, said heat reactive polymer member being in combination with a member selected from the group consisting of an etherified melamine-formaldehyde resin and an etherified urea-formaldehyde resin.

2. An emulsion coating composition as claimed in claim 1 wherein the first component of said mixture constituting said heat reactive polymer is said ether epoxide oil-modified alkyd resin which is conjointly polymerized with a vinylidene monomer in the presence of an organic peroxide polymerization catalyst and a tertiary amine activator for said catalyst, said activator partially curing said polyether polyepoxide.

3. An emulsion coating composition as claimed in claim 2 wherein the etherified melamine-formaldehyde resin is a butylated melamine-formaldehyde resin.

4. An emulsion coating composition as claimed in claim 2 wherein said amine activator is dimethyl aniline.

5. A coating composition as claimed in claim 1 wherein a siloxane polymer is added to said heat reactive polymer.

6. A coating composition as in claim 1 wherein a titanium ester of a polybasic acid is added to said heat reactive polymer.

7. A coating composition as in claim 2 wherein said vinylidene monomer is vinyl acetate.

8. A coating composition as in claim 2 wherein said vinylidene monomer is styrene.

9. A coating composition as in claim 2 wherein said vinylidene monomer is diallyl phthalate.

10. A coating composition as in claim 2 wherein said vinylidene monomer is diallyl cyanamide.

11. A coating composition as in claim 7 wherein said vinyl acetate mixed polymer is hydrolyzed to substitute a substantial amount of hydroxyl groups for the acetate groups of the polymer.

12. A coating composition as in claim 1 to which is added an amine epoxy curing catalyst in an amount of .5 to 5% by weight of the resin components.

13. A coating composition as in claim 1 wherein said fatty acid modifying said epoxide oil-modified alkyd resin is lauric acid in an amount of at least 20%.

14. A coating composition as in claim 1 wherein said fatty acid modifying said epoxide oil-modified alkyd resin is ricinoleic acid in an amount of at least 20%.

15. A coating composition as in claim 1 wherein said fatty acid modifying said epoxide oil-modified alkyd resin is linsed oil fatty acid.

References Cited in the file of this patent

UNITED STATES PATENTS

| | | |
|---|---|---|
| 2,538,072 | Zech | Jan. 16, 1951 |
| 2,581,464 | Zech | Jan. 8, 1952 |
| 2,591,539 | Greenlee | Apr. 1, 1952 |
| 2,604,463 | Bitton et al. | July 22, 1952 |
| 2,681,322 | Auer | June 15, 1954 |
| 2,684,345 | Yuska et al. | July 20, 1954 |